United States Patent [19]

Anada

[11] Patent Number: 5,517,872

[45] Date of Patent: May 21, 1996

[54] DRIVE APPARATUS

[75] Inventor: Katsuya Anada, Gifu, Japan

[73] Assignee: Nippon Thompson Co., Ltd., Tokyo, Japan

[21] Appl. No.: 230,224

[22] Filed: Apr. 20, 1994

[30] Foreign Application Priority Data

May 17, 1993 [JP] Japan .................................. 5-030649

[51] Int. Cl.$^6$ .................................................. F16H 19/08
[52] U.S. Cl. .................................. 74/89.21; 74/89.22
[58] Field of Search .............................. 74/89.2, 89.21, 74/89.22

[56] References Cited

U.S. PATENT DOCUMENTS

| 3,010,328 | 11/1961 | Forey | 74/89.22 X |
| 4,760,750 | 8/1988 | Kondoh | 74/89.2 |
| 5,100,284 | 3/1992 | Boisseau | 74/89.22 |
| 5,259,255 | 11/1993 | Urban et al. | 74/89.22 X |
| 5,331,862 | 7/1994 | Baginski et al. | 74/89.22 |

FOREIGN PATENT DOCUMENTS 4-289043  10/1992  Japan.

OTHER PUBLICATIONS

IBM Technical Disclosure Bulletin; vol. 25 No. 9 Feb. 1983 "Counterweighted Print Head Drive" (two pages).

*Primary Examiner*—Allan D. Herrmann
*Attorney, Agent, or Firm*—Sughrue, Mion, Zinn, Macpeak & Seas; Richard C. Turner; Marc Kaufman

[57] ABSTRACT

A drive apparatus employs a constitution wherein moving objects respectively equipped on a plurality of sets of guiding mechanisms are made to approach and move away from each other point symmetrically by a single driving device through a belt-shaped member.

2 Claims, 9 Drawing Sheets

DRIVE APPARATUS

BACKGROUND OF THE INVENTION

1. Field of the Invention

The present invention relates to a drive apparatus for moving an object (driven object) in a desired direction.

2. Description of the Related Art

An example of this type of drive apparatus of the prior art is shown in FIG. 1. This drive apparatus is disclosed in Japanese Patent Laid-Open Publication No. 4-289043.

As shown in the drawing, the drive apparatus has a guiding mechanism in the form of two sets of linear motion rolling guide units 1. These linear motion rolling guide units 1 are composed of track rails 2, and sliders 3 which are guided by the track rails 2. Table 5 is attached to the sliders 3. Furthermore, although not shown in the drawing, a large number of rolling elements in the form of balls are arranged and contained to circulate freely within sliders 3. These balls roll along the tracks of track rails 2 while circulating along with movement of sliders 3.

Two rotary members in the form of pulleys 6 and 7 are arranged near both ends of the above-mentioned track rails 2, and one of the pulleys, pulley 7, is fit onto output shaft 8a of motor 8. Belt 9 is wrapped around both of the pulleys, and a portion of the belt 9 is coupled to the above-mentioned table 5. Namely, belt 9 is driven by forward and reverse rotation of motor 8, which moves table 5 in a reciprocating fashion.

The above-mentioned drive apparatus can be used to perform the following work.

Namely, one example of such work consists of the drilling of holes in a certain object using a drill. In this case, this work can be assumed to be performed following the procedure shown in FIG. 2.

In FIG. 2, reference numeral 10 indicates an area for performing drilling on a certain object (not shown), which is the target workpiece, using a processing apparatus not shown. In addition, reference numeral 11 indicates an area at which supply and collection of said object are performed. The target workpiece is installed on table 5 at area 11, carried to area 10 by movement of the table 5 and processed. When processing is completed, table 5 returns to area 11 and the target workpiece is removed from table 5 and collected.

In the case of attempting to improve the efficiency of processing work in the above-mentioned constitution, it can be considered to simply arrange, for example, two drive apparatuses as shown in FIG. 2 and operate these drive apparatuses in synchronization.

However, since a plurality of drive apparatuses are provided in this arrangement, there are the disadvantages of having to make available a large amount of installation space and associated increases in costs. In addition, mutually coordinating the operating timing of each drive apparatus must also be taken into consideration in order to efficiently proceed with the work. Since it is therefore necessary to provide a control circuit and so forth for this purpose, it is difficult to lower costs and reduce maintenance and so forth.

SUMMARY OF THE INVENTION

Therefore, in consideration of the above-mentioned disadvantages of the prior art, the object of the present invention is to provide a drive apparatus occupying a small amount of space, having functions which double the capacity of apparatuses of the prior art at low cost, and allow maintenance and control to be performed easily.

The drive apparatus according to the present invention is equipped with: a plurality of guiding mechanisms, each having a moving object to be guided, and arranged so that the guiding direction is roughly parallel; a plurality of rotary members arranged separated from each other in said guiding direction; a belt-shaped member wrapped around said rotary members and coupled to said moving object; and, a driving device which drives said belt-shaped member; wherein, each of said moving objects is arranged so as to approach each other by rotation of said rotary members in one direction, and move away from each other by rotation of said rotary members in the opposite direction.

DESCRIPTION OF THE PREFERRED EMBODIMENTS

The following provides an explanation of a drive apparatus as an embodiment of the present invention with reference to the drawings.

As shown in FIGS. 3 through 7, the drive apparatus has a case, and the case is composed of long base member 21, end plates 22 and 23 coupled to both ends of the base member 21, and thin plate-shaped side covers 24 and 25 provided along both the left and right sides of the base member 21.

Figure 3:
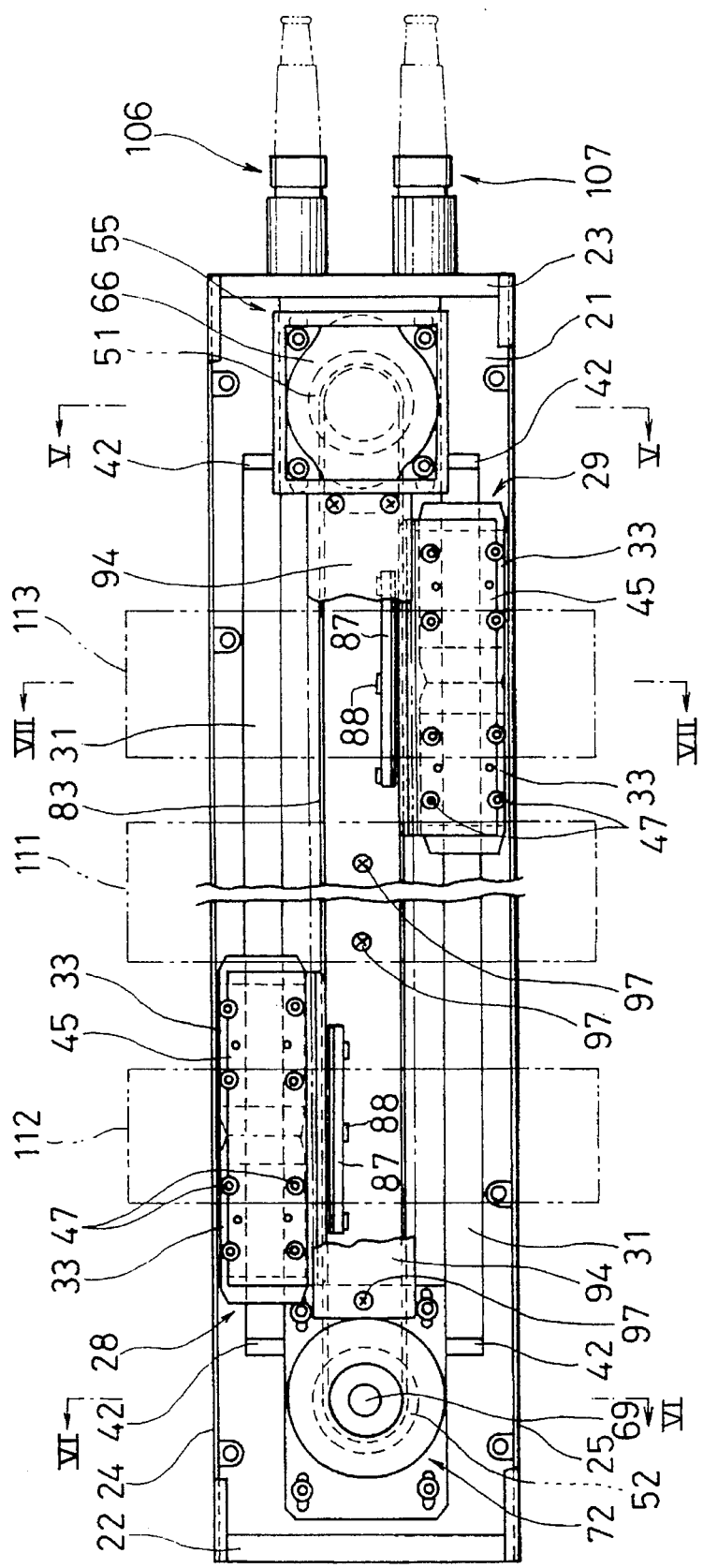
FIG. 3 is an overhead view including a partial cross-section of a drive apparatus as an embodiment of the present invention.
Figure 4:
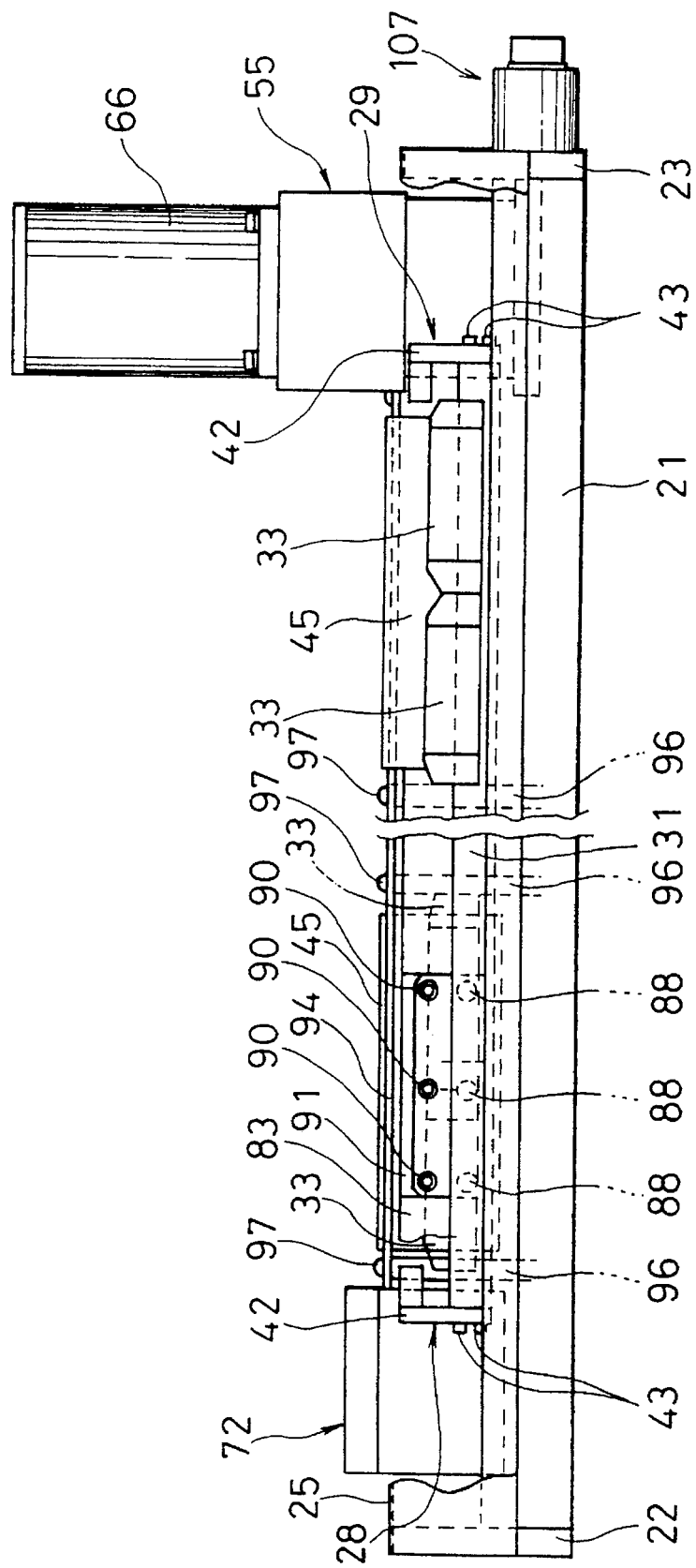
FIG. 4 is a side view including a partial cross-section of the drive apparatus shown in FIG. 3.
Figure 7:
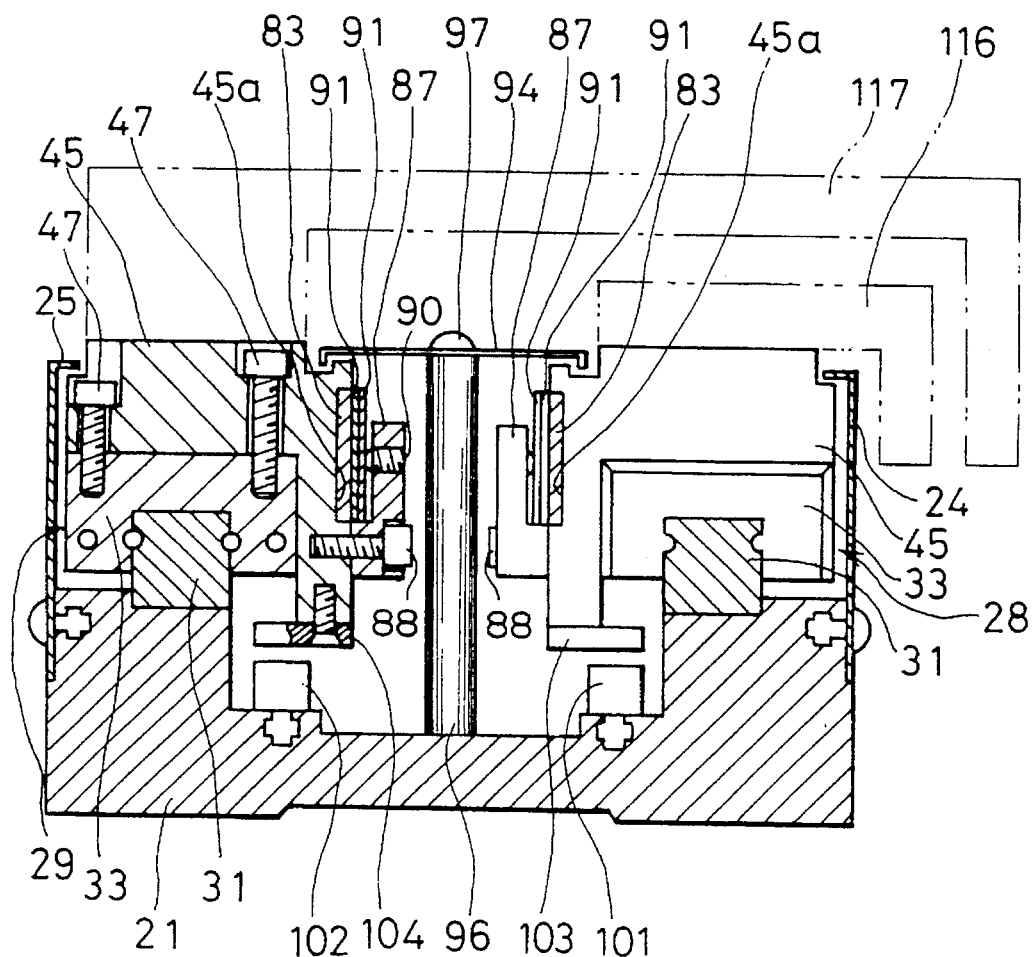
FIG. 7 is a cross-sectional view of section VII—VII relating to FIG. 3.

As shown in FIGS. 3, 4 and 7, two sets of guiding mechanisms in the form of linear motion rolling guide units 28 and 29 are provided on base member 21.

Figure 8:
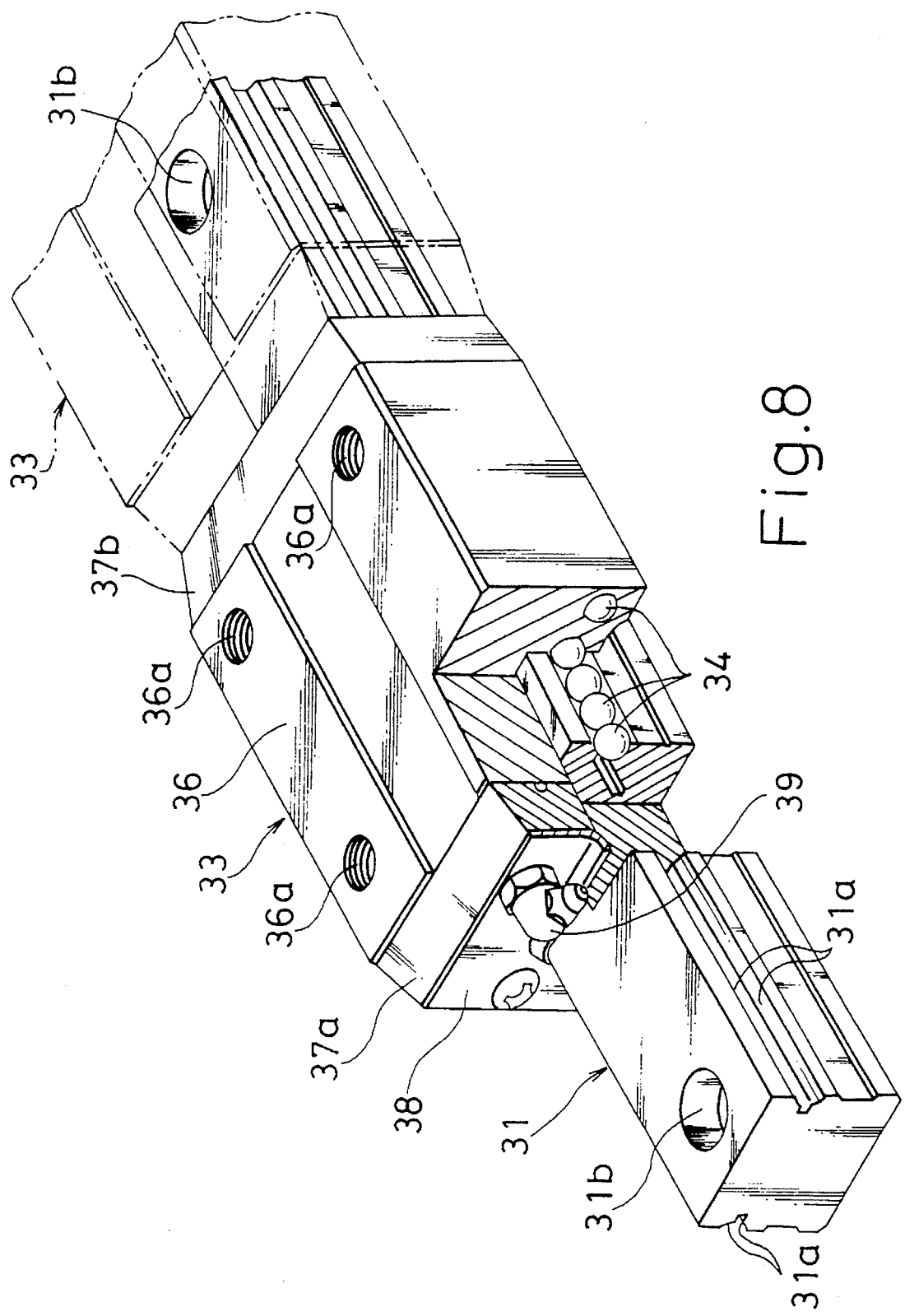
FIG. 8 is a perspective view including a partial cross-section of the essential portion of a linear motion rolling guide unit equipped on the drive apparatus shown in FIG. 3.
Figure 9:
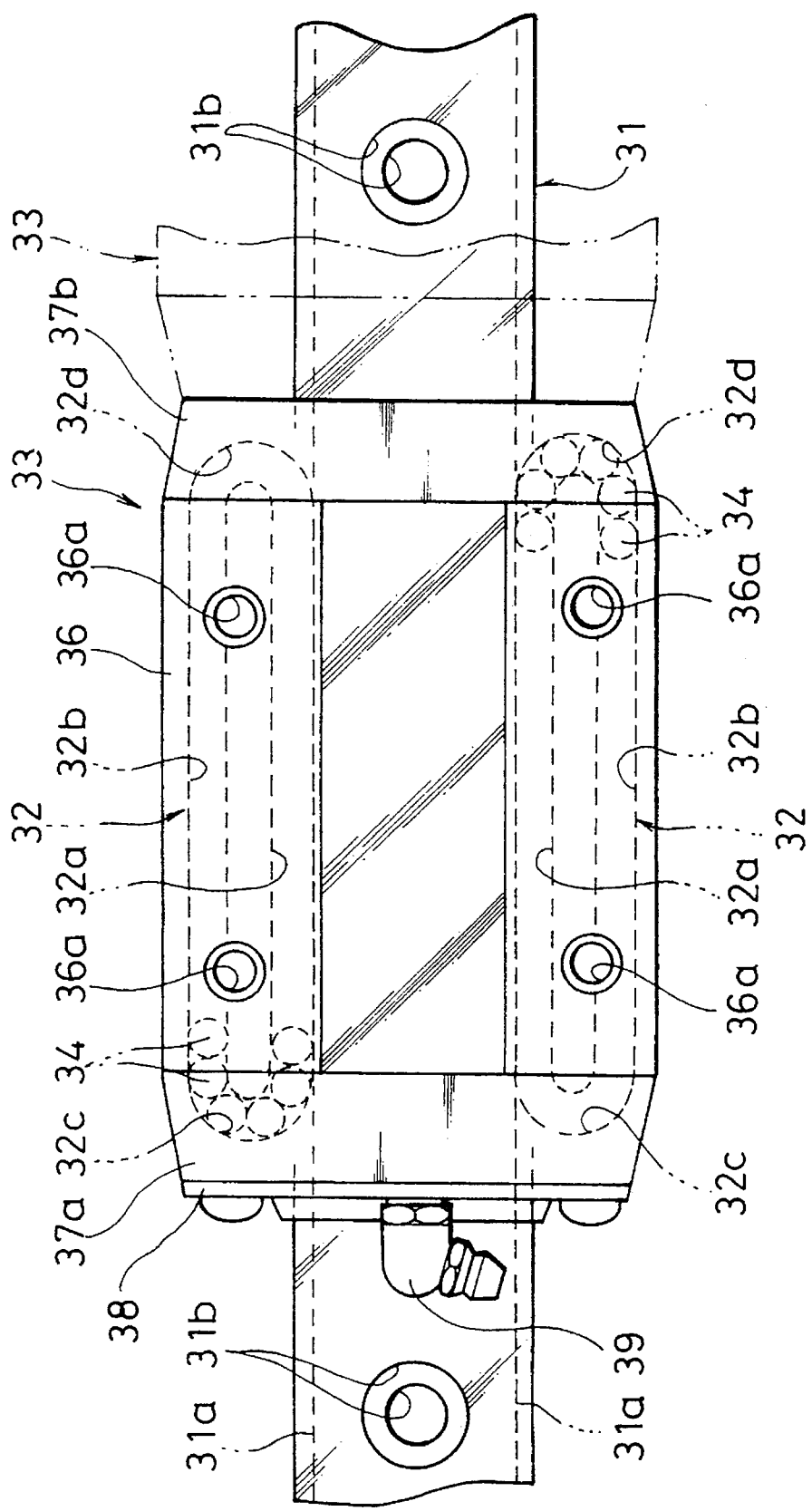
FIG. 9 is an overhead view of the device shown in FIG. 8.

A detailed description of the construction of these linear motion rolling guide units 28 and 29 is provided based on FIGS. 8 and 9. However, since both linear motion rolling guide units 28 and 29 are composed in a similar manner, an explanation is provided only with respect to one linear motion rolling guide unit 28, while that of the other linear motion rolling guide unit 29 is omitted.

Furthermore, the same reference numerals are indicated for those constituent members of linear motion rolling guide unit 29 that correspond to the constituent members of linear motion rolling guide unit 28 in each of the drawings.

As shown in FIGS. 8 and 9, said linear motion rolling guide unit 28 is composed of track rail 31, in which one track in the form of track groove 31a each is formed in both the left and right sides along the lengthwise direction, a slider in the form of slide unit 33 having rolling element circulating path 32 (to be later described in detail) and which is able to freely perform relative motion with respect to this track rail 31, and a large number of rolling elements in the form of balls 34 arranged and contained within said rolling element circulating path 32 and which bear the load between track rail 31 and slide unit 33 by circulating while rolling over the above-mentioned track rails 31a accompanying movement of this slide unit 33. However, two slide units 33 are provided, and these slide units are mutually coupled at their ends. Furthermore, one slide unit may be provided for each track rail. In addition, in the case of providing two slide units on a single track rail as described above, it is not always necessary to couple both slide units at their ends.

Slide unit 33 has casing 36 provided so as to be straddled about track rail 31, a pair of end caps 37a and 37b coupled to both the front and back ends of said casing 36, and seal 38 attached to the outer surface of said end cap 37a. Furthermore, grease nipple 39 is attached to end cap 37a for supplying grease to the above-mentioned balls 34. As shown in FIG. 9, rolling element circulating path 32 is composed of load bearing track groove 32a and return path 32b, each formed linearly and mutually in parallel in casing 36, and a pair of roughly semicircular direction changing paths 32c and 32d formed in both end caps 37a and 37b which connect said load bearing track groove 32a and return path 32b at both their ends. Furthermore, the above-mentioned load bearing track groove 32a corresponds to track groove 31a of track rail 31.

Figure 5:
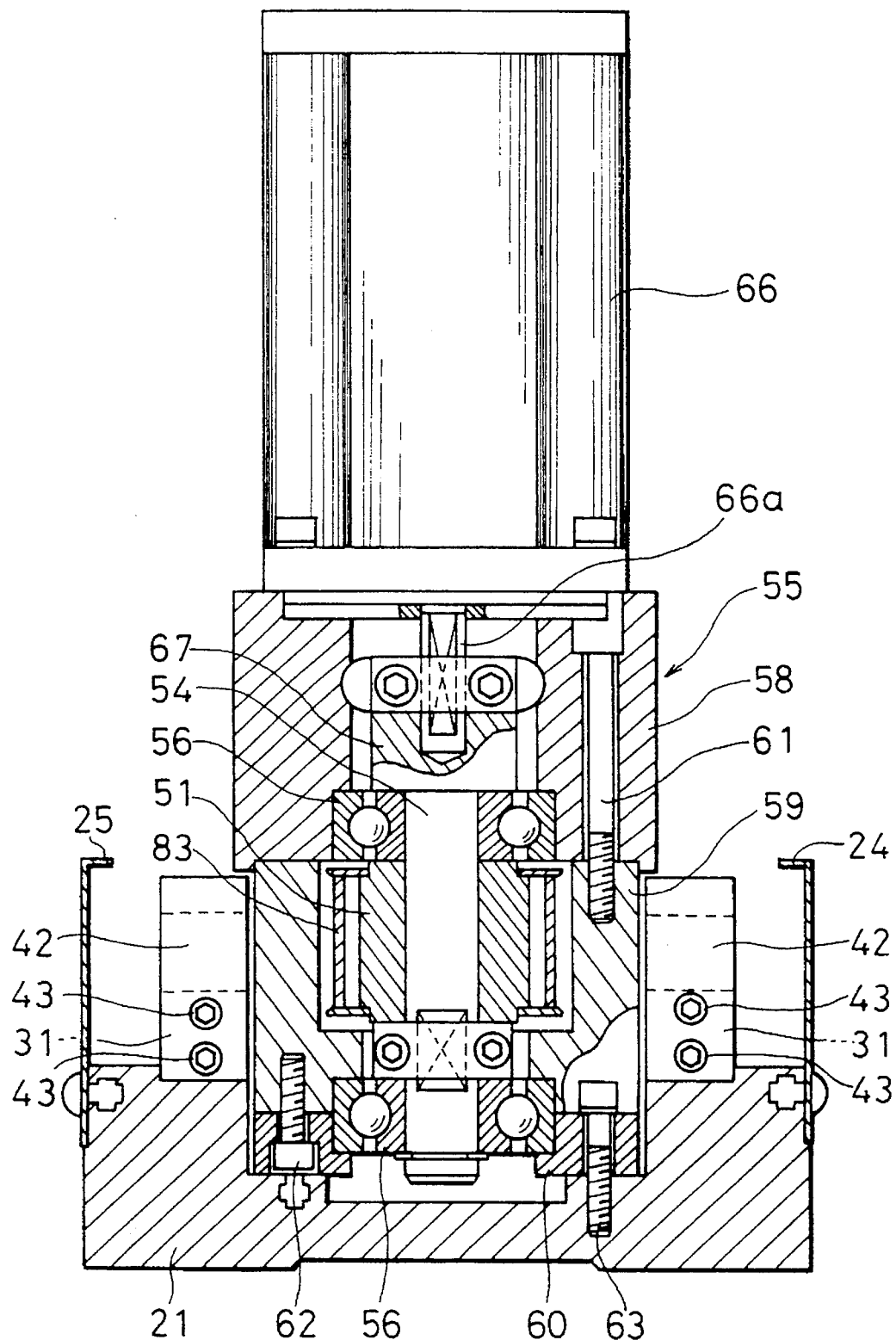
FIG. 5 is a cross-sectional view of section V—V relating to FIG. 3.

Linear motion rolling guide units 28 and 29 having the above-mentioned construction are arranged on base member 21 as shown in FIGS. 3 through 5 and 7. Track rails 31 are fastened to the base member 21 by bolts (with hexagon sockets, not shown). Consequently, as shown in FIGS. 8 and 9, a plurality of insertion holes 31b are provided in a row along the lengthwise direction in track rail 31 into which the bolts are inserted. Furthermore, the guiding directions of sliders in the form of slide members 33 are arranged to be mutually in parallel in both linear motion rolling guide units 28 and 29. In addition, as shown in FIGS. 3 through 5, stoppers 42 are arranged on both ends of track rail 31 to prevent slide unit 33 from coming off the track rail 31, and are fixed to the track rail 31 by bolts 43.

As shown in FIGS. 3, 4 and 7, table 45 is attached to the above-mentioned slide unit 33. More specifically, as shown in FIGS. 8 and 9, for example, four threaded holes 36a are formed in the upper surface of casing 36 of slide unit 33, and the above-mentioned table 45 is fastened to slide unit 33 by bolts 47 (with hexagon sockets, shown in FIGS. 3 and 7) which are screwed into these threaded holes 36a.

As shown in FIG. 3, two rotary members in the form of toothed belt pulleys 51 and 52 are arranged so as to be sandwiched around both of the above-mentioned linear motion rolling guide units 28 and 29, while also being separated from each other in the guiding direction of each of said linear motion rolling guide units 28 and 29.

As shown in FIG. 5, one toothed belt pulley 51 is fit onto shaft 54. This shaft 54 is supported to rotate freely at both ends by two ball bearings 56 provided within bearing box 55. Furthermore, the bearing box 55 is composed by connecting three cylindrical bearing support members 58, 59 and 60, fit onto each ball bearing 56 and arranged mutually concentrically, by bolts 61 and 62, and anchoring to base member 21 by bolts 63.

As shown in FIGS. 3 and 4, a driving device in the form of motor 66 is mounted on the above-mentioned bearing box 55 with its output shaft 66a (shown in FIG. 5) facing downward, and the above-mentioned shaft 54 is connected to this output shaft 66a by means of coupling 67.

Figure 6:
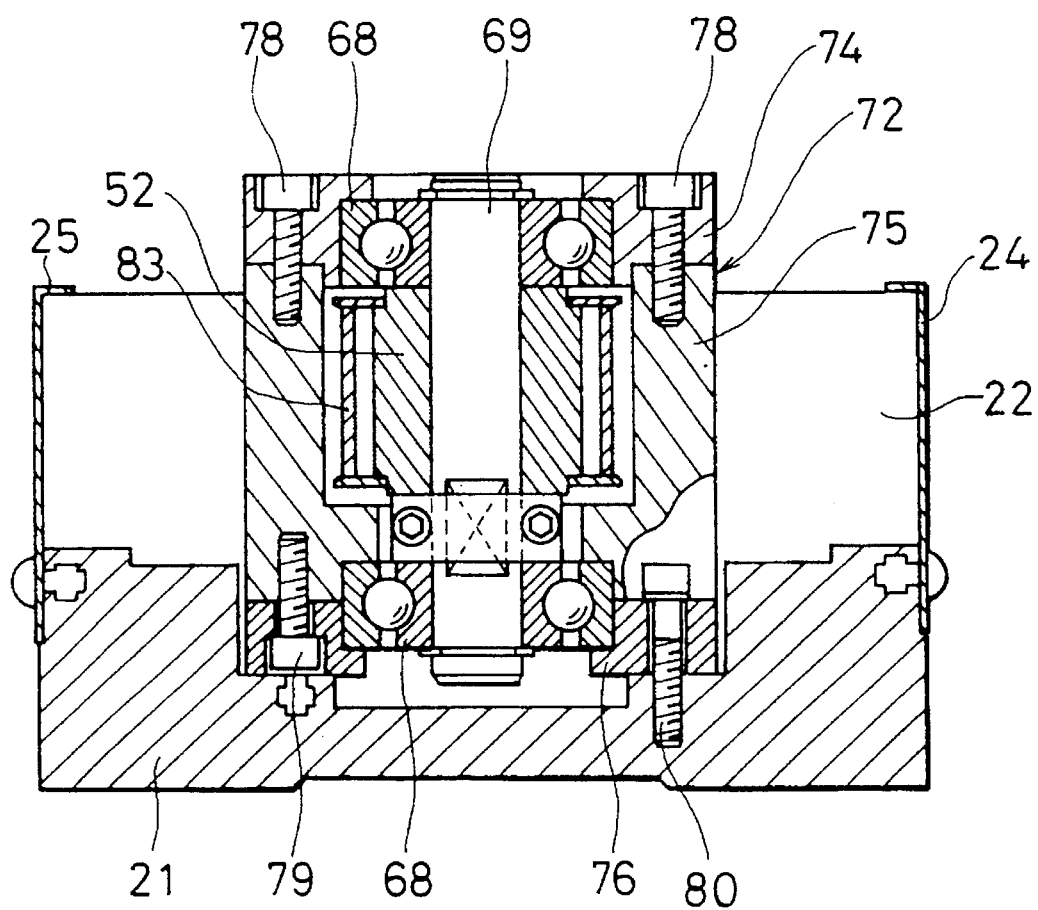
FIG. 6 is a cross-sectional view of section VI—VI relating to FIG. 3.

On the other hand, as is clear from FIG. 6, the other toothed belt pulley 52 is also fit onto shaft 69 supported to rotate freely at both ends by two ball bearings 68. Both of the ball bearings 68 are provided within bearing box 72. Furthermore, the bearing box 72 is composed by connecting three cylindrical bearing support members 74, 75 and 76, fit onto each ball bearing 68 and arranged mutually concentrically, by bolts 78 and 79, and anchoring to base member 21 by bolts 80.

As shown in FIGS. 3 through 6, a belt-shaped member in the form of endless toothed belt 83 is wrapped around the above-mentioned two tooth belt pulleys 51 and 52. Namely, the endless toothed belt 83 is composed such that it moves in reciprocating fashion resulting from the forward and reverse rotation of the above-mentioned motor 66.

The above-mentioned toothed belt 83 is coupled to a moving object in the form of slide unit 33, equipped on both linear motion rolling guide units 28 and 29 positioned on both sides of said toothed belt 83. As is clear from FIG. 3, each slide unit 33 of both linear motion rolling guide units 28 and 29 is coupled to toothed belt 83 and arranged so as to approach each other by rotation of both toothed belt pulleys 51 and 52 in one direction, and move away from each other by rotation of both toothed belt pulleys 51 and 52 in the opposite direction.

The following provides a detailed description of the manner in which the above-mentioned toothed belt 83 is coupled to slide unit 33 of both linear motion rolling guide units 28 and 29.

As shown in FIG. 7, the above-mentioned toothed belt 83 is not directly coupled to slide unit 33, but rather coupled to table 45 attached to said slide unit 33.

Namely, as shown in said drawing, indentation 45a is formed in the inner surface of said table 45, and a portion of toothed belt 83 is inserted into this indentation 45a. Belt clamp 87 is fastened by bolt 88 at its lower end to the lower portion of the inner surface of table 45. Screw 90 is screwed into the upper end of this belt clamp 87, and the end of said screw 90 presses against toothed belt 83 by means of thin plate-shaped inclusion 91 to secure to the bottom surface of the above-mentioned indentation 45a. Furthermore, the above-mentioned belt clamp 87 and so forth are also shown in FIGS. 3 and 4. Since toothed belt 83 is coupled to each table 45 in this manner, the operating stroke of each table 45 can be changed by suitably altering the coupling location.

However, as shown in FIGS. 3, 4 and 7, a long top cover 94, which covers the above-mentioned toothed belt 83, is arranged above the toothed belt 83. As is particularly clear from FIG. 7, the top cover 94 is fixed to the top ends of a plurality of support columns 96 arranged in a row along the lengthwise direction on base member 21 by screws 97. Furthermore, an arrangement may also be employed wherein, instead of this type of support columns 96, long support columns (not shown) having, for example, an I-shaped cross-section, are fixed to base member 21, and the above-mentioned top cover 94 is attached on these support columns. In this case, the rigidity of the entire drive apparatus is increased by providing the support columns, thereby facilitating lengthening of the drive apparatus.

Reference numerals 101 and 102 in FIG. 7 indicate magnetic resistance elements (MR elements). These magnetic resistance elements 101 and 102 act as sensors for sensing that table 45 attached to slide unit 33 of both linear motion rolling guide units 28 and 29 has reached a prescribed location, and more specifically, the magnetic resistance elements 101 and 102 detect magnets 103 and 104 attached to the lower end of each said table 45 with screws. However, FIG. 7 shows a cross-sectional view of section VII—VII relating to FIG. 3, and both the above-mentioned magnetic resistance elements 101 and 102 are provided so as to sense that each table 45 has reached the movement limit location in the direction to the right of this FIG. 3. In addition, although not shown in the drawing, magnetic resistance elements are provided for sensing that both tables 45 have reached the movement limit location in the direction to the left of FIG. 3, as well as for sensing that both tables 45 have reached a roughly central location between the left and right movement limit locations.

Furthermore, reference numeral 106 in FIGS. 3 and 4 indicates a connector terminal for supplying electrical power to motor 66 previously described, while reference numeral 107 indicates a connector terminal for obtaining the detection signals generated by each of the above-mentioned magnetic resistance elements.

Next, the following provides a brief explanation of the operation of the drive apparatus having the above-mentioned composition. In this case, operation is explained in the case of using the drive apparatus for the work described below.

Namely, this work consists of, for example, performing drilling processing on a certain object using a drill.

Reference numeral 111 in FIG. 3 indicates the area for performing drilling processing on a target workpiece (not shown) by a processing apparatus not shown, and said area 111 is set corresponding to the roughly central location between both the left and right movement limit locations of each table 45 described above. In addition, reference numerals 112 and 113 indicate areas for performing supply and collection of the target workpiece, and these areas 112 and 113 are each set corresponding to the movement limit location in the direction to the left and the movement limit location in the direction of the right of FIG. 3, respectively.

When work is started, the target workpieces are first installed on each table 45 at both the above-mentioned areas 112 and 113. However, the target workpieces are not installed directly on both the tables 45, but rather are installed on jigs 116 and 117 mounted on both tables 45 as shown in FIG. 7. Furthermore, both jigs 116 and 117 are only shown in FIG. 7, and are not shown in the other drawings. As is clear from the drawing, both jigs 116 and 117 are formed to not protrude towards each other. Accordingly, both tables 45 are able to move by a full stroke between both right and left areas 112 and 113 shown in FIG. 3.

As described above, once the target workpieces have been installed on each jig 116 and 117 at areas 112 and 113, motor 66 is rotated in the forward direction to drive toothed belt 83. Both jigs 116 and 117 then move point symmetrically to approach each other to bring the target workpieces to area 111 shown in FIG. 3. Drilling processing is then performed on each of the target workpieces on both jigs 116 and 117 at said area 111.

Once drilling processing has been completed, motor 66 is rotated in the reverse direction and both jigs 116 and 117 move point symmetrically to move away from each other and return to starting areas 112 and 113. The target workpieces are then removed from both of the jigs and collected.

Figure 1:
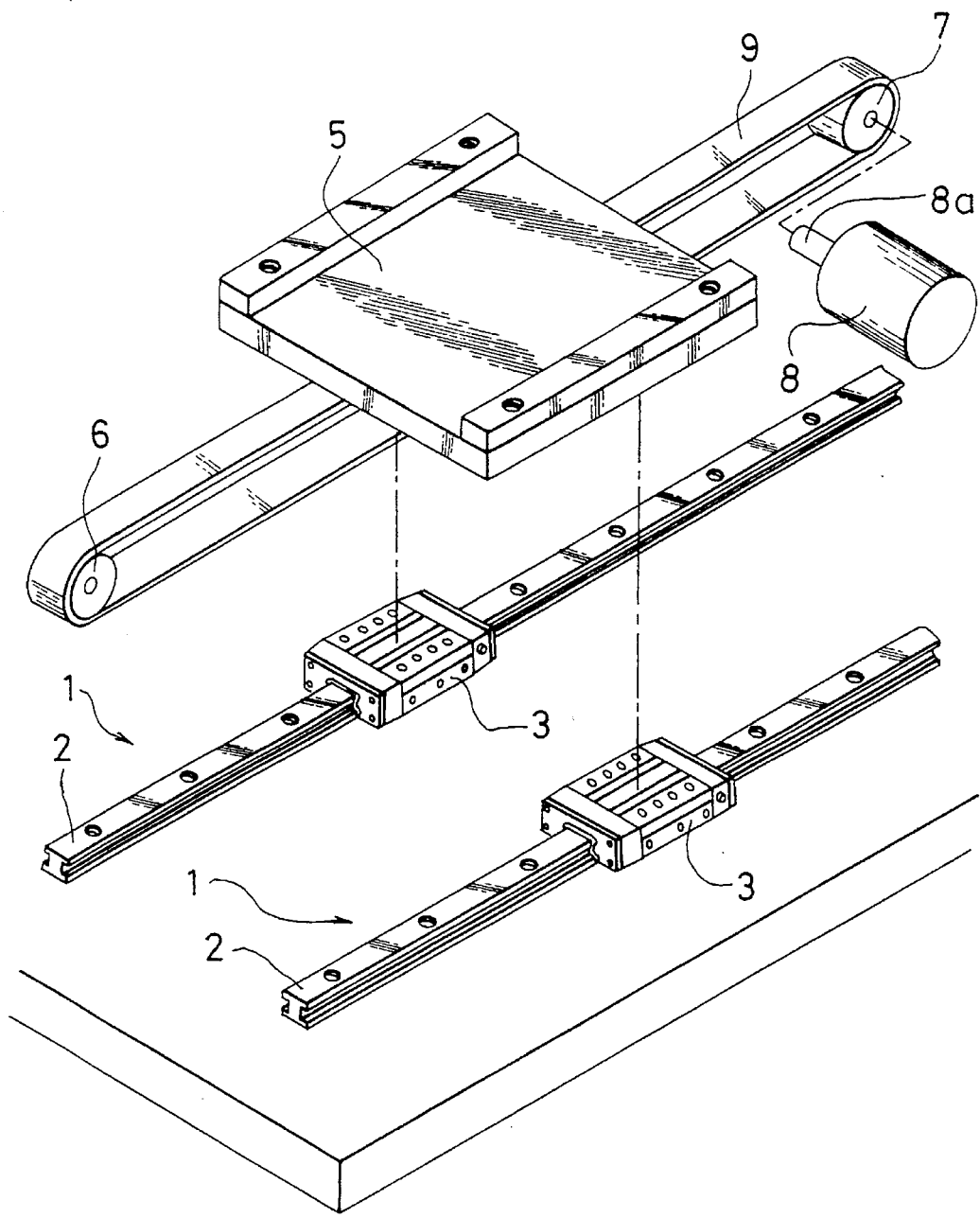
FIG. 1 is an exploded perspective view of a drive apparatus of the prior art.
Figure 2:
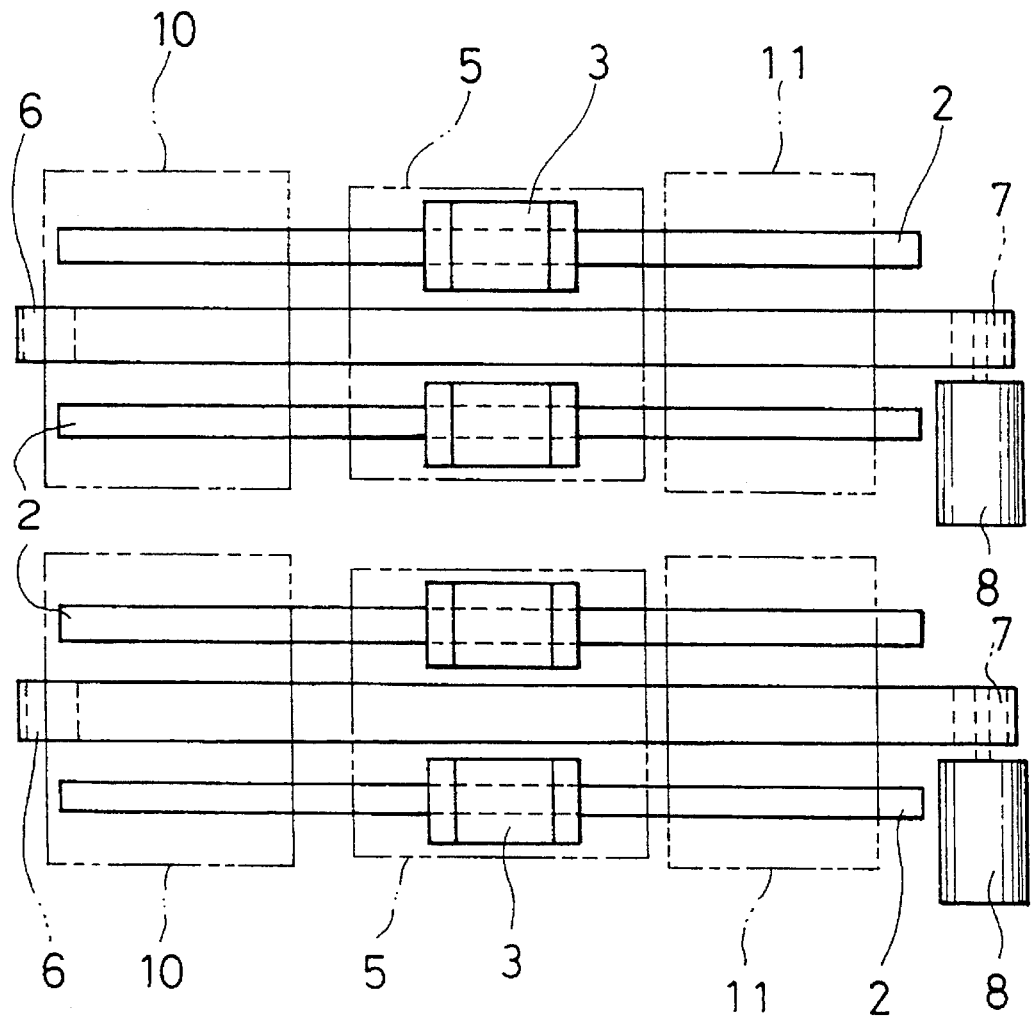
FIG. 2 is an overhead view indicating two of the drive apparatuses shown in FIG. 1 arranged in parallel.

In the drive apparatus as claimed in the present embodiment described above, slide units 33 respectively equipped on two sets of linear motion rolling guide units 28 and 29 approach and move away from each other point symmetrically according to the rotation of a single motor 66. By using a drive apparatus of this construction, work can be performed that is equivalent to using two of the drive apparatuses of the prior art shown in FIGS. 1 and 2. In addition, in the drive apparatus as claimed in the present invention, since each slide unit 33, namely each moving object, of both linear motion rolling guide units 28 and 29 are coupled to the same toothed belt 83, the operating timing of each slide unit 33 is spontaneously coordinated, thus eliminating the need to coordinate the operating timing of a plurality of apparatuses in the manner of the above-mentioned apparatus of the prior art. Thus, together with this eliminating the need for a control circuit and so forth for coordinating operating timing, maintenance and control can be performed easily by the worker.

Furthermore, although the present embodiment indicates the case of using the drive apparatus for performing drilling processing work and so forth, if the overall size of the drive apparatus is made smaller, it can also be applied for driving the gripping arm mechanism and so forth in an industrial robot and so forth. Namely, the gripping arm mechanism is equipped with a plurality of gripping arms for gripping objects, and these gripping arms are relatively made to approach and move away from each other to perform gripping and release. This means that each of the gripping arms is installed on each moving object in the form of slide unit 33 equipped on the two sets of linear motion rolling guide units 28 and 29 in the drive apparatus of the present embodiment.

In addition, although a toothed belt 83 is used for the belt-shaped member in the present embodiment, other types of belts, including the flat belts or V-belts, as well as a chain and so forth, can naturally also be used. In addition, the driving device which drives these belt-shaped members is not limited to motor 66, but a constitution may also be employed wherein a hydraulic cylinder and so forth is used.

In the drive apparatus according to the present invention as explained above, the present invention offers the advantage of being able to demonstrate functions which double the capacity of a driving apparatus of the prior art despite its occupied space and production cost being roughly equal to a single drive apparatus of the prior art. In addition, since a plurality of moving objects with which it is equipped are coupled together to a belt-shaped member, the operation timing of each moving object is coordinated spontaneously, thus eliminating the need to coordinate the operating timing of a plurality of apparatuses in the manner of said apparatus of the prior art. Together with this enabling costs to be lowered since a control circuit and so forth for coordinating operating timing is not required, it also offers the advantage of facilitating maintenance and control by the worker.

What is claimed is:

1. A drive apparatus comprising:

a plurality of guiding mechanisms, each having a track rail arranged on a base member so that the guiding direction is roughly parallel to the left and right, and a moving object guided by said track rail;

left and right tables mounted on said moving objects;

two rotating members arranged above said base member in the vertical direction and separated from each other in said guiding direction;

a belt-shaped member wrapped around said rotary members and coupled to said moving object; and a driving device which drives said belt-shaped member; wherein, each of said left and right tables mounted on said moving objects is arranged so as to approach each in response to rotation of said rotary members in one direction, and move away from each other in response to rotation of said rotary members in the opposite direction.

2. The drive apparatus as set forth in claim 1 wherein said belt-shaped member is arranged between said guiding mechanisms.

\* \* \* \* \*